United States Patent [19]

Davis et al.

[11] Patent Number: 5,166,508
[45] Date of Patent: Nov. 24, 1992

[54] OPTICAL PROCESSOR FOR CONTROLLING A DEFORMABLE MIRROR

[75] Inventors: Dennis W. Davis, Boca Raton, Fla.; Jeffrey A. Shimizu, Crompound, N.Y.

[73] Assignee: United Technologies Corporation, Hartford, Conn.

[21] Appl. No.: 763,023

[22] Filed: Sep. 20, 1991

[51] Int. Cl.[5] .................................. G01J 1/20
[52] U.S. Cl. .................................. 250/201.9; 356/121
[58] Field of Search .................. 250/201.1, 201.9; 356/353-356, 121; 359/845-849

[56] References Cited

U.S. PATENT DOCUMENTS

| 4,091,274 | 5/1978 | Angelbeck et al. | 250/201.9 |
| 4,141,652 | 2/1979 | Feinleib | 356/121 |
| 4,326,800 | 4/1982 | Fitts | 250/201.9 |
| 4,399,356 | 8/1983 | Feinleib et al. | 356/121 |
| 4,441,019 | 4/1984 | Hardy | 250/201.9 |
| 4,472,029 | 9/1984 | Hardy | 250/201.9 |
| 4,682,025 | 7/1987 | Livingston et al. | 250/201.9 |
| 4,967,063 | 10/1990 | Wang et al. | 250/201.1 |
| 4,996,412 | 2/1991 | Anafi et al. | 356/353 |
| 5,026,977 | 6/1991 | Hubbard, Jr. | 356/353 |
| 5,083,015 | 1/1992 | Witthoft et al. | 356/354 |

OTHER PUBLICATIONS

Dan Dudgeon, Russell Mersereau, "Multidimensional Digital Signal Processing", Discussion of Iterative Constrained Deconvolution, Prentice-Hall, 1984, pp. 350-354.
UTOS IR & D Review "Optical Image and Signal Processing", Jun. 15, 1988.
Li-Jen Cheng, Gregory Gheen, Tien-Hsin Chao, Hua-Kuang Liu, Afshin Partovi, Joseph Katz and Elsa M. Garmire, "Spatial Light Modulation by Beam Coupling in GaAs Crystals", Optics Letters, Sep. 1987, vol. 12, No. 9, pp. 705-707.
Arthur E. Chiou and Pochi Yeh, "Laser-Beam Cleanup Using Photorefractive Two-Wave Mixing and Optical Phase Conjugation", Optics Letters, Jul. 1986, vol. 11, No. 7, pp. 461-463.
David Peri, "Optical Implementation of a Phase Retrieval Algorithm", Applied Optics, May 1, 1987, vol. 26, No. 9, pp. 1782-1785.
Sing H. Lee, "Optical Analog Solutions of Partial Differential and Integral Equations", Optical Engineering, Jan./Feb. 1985, vol. 24, No. 1, pp. 041-047.

Primary Examiner—David C. Nelms
Assistant Examiner—S. B. Allen
Attorney, Agent, or Firm—Eric W. Petraske

[57] ABSTRACT

An optical processing system for controlling a deformable mirror employs iterative constrained deconvolution of an actuator influence function with a set of optical representations of spatial impulse functions related to the settings of the actuators. An input optical beam is first transformed to a beam having a uniform phase amplitude proportional to the phase of the incoming beam at corresponding locations.

3 Claims, 10 Drawing Sheets

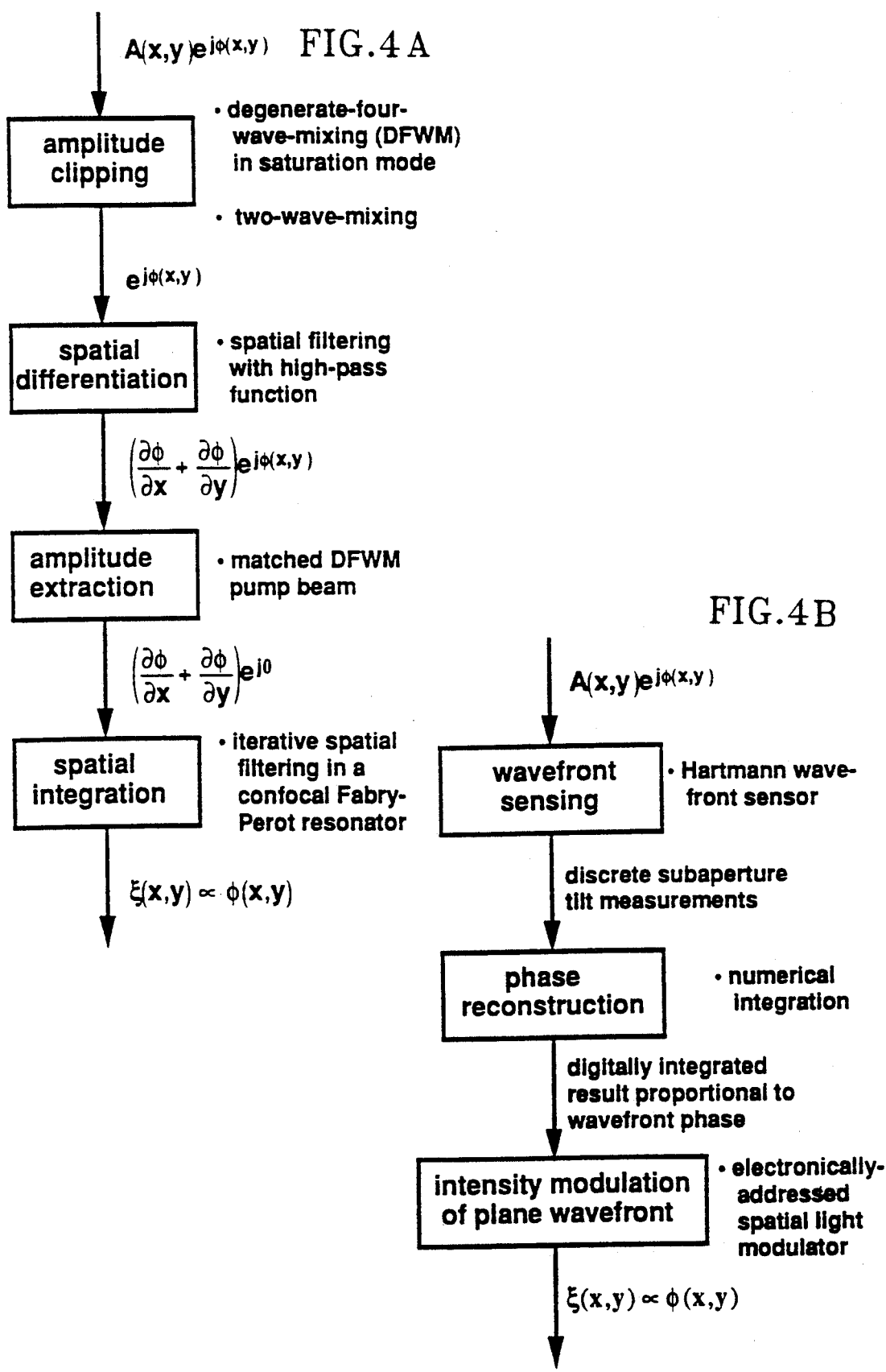

OPTICAL PROCESSOR FOR CONTROLLING A DEFORMABLE MIRROR

DESCRIPTION

1. Technical Field

The field of the invention is that of optical computing, in particular, the real time control of an electrical device using an incoming optical beam as input.

2. Background Art

The problem of controlling a deformable mirror to manipulate the phase of an optical beam and to correct that phase for aberration imparted to the beam by propagation through the atmosphere or for any other purpose has long been adversely affected by the time required to make computations. The conventional approach to wavefront correction makes use of three major components in a closed loop control system, a wavefront sensor, processor and deformable mirror. The wavefront sensor measures the local x and y tilt of the wavefront in a multiplicity of subapertures across the wavefront. An electronic processor then computes the wavefront phase function from these samples of the spatial derivatives of the wavefront phase. The deformable mirror is a device which manipulates the phase of an optical beam by altering the shape of the mirror surface. The surface shape is controlled by a set of actuators placed below the surface. Each actuator has a finite region of influence over the mirror surface, and the spatial nature of the influence is characterized by the actuator influence function. The surface shape resulting from a given set of actuator displacements is described by the convolution of the actuator influence function with a set of impulse functions representing the position and amplitude of the mirror actuators. By making use of stored information regarding the position and influence function behavior of the deformable mirror actuators, the processor computes the actuator displacements required to create a surface on the deformable mirror which is a conjugate fit to the sensed wavefront (so as to compensate the wavefront phase upon reflection). Digital values for the actuator displacements are converted to analog electrical drive signals which are typically applied to piezoelectric or magnetostrictive actuators mounted in contact with the deformable mirror back surface.

The direct approach to the wavefront correction computation can be stated as follows: Given a set of phase slope sensor measurements, directly compute mirror actuator commands. This involves solving the matrix-vector equation $$H_D a = z$$

where z is the set of phase-slope measurements, $\hat{a}$ is the actuator command vector to be estimated and $H_D$ is a sparse matrix whose elements are the scaled gradients of the actuator-mirror influence function. This system of equations can be rewritten as follows $$H^T_D H_D a = H^T_D z$$

where T denotes the transpose operator. This form of the equations is often referred to as the normal form. For the case of N actuators and 2M sensors (x and y directions) the matrix-vector dimensions are:

$\hat{a}$: $N \times 1$ actuator command column vector
z: $2M \times 1$ slope measurement column vector
$H_D$: $2M \times N$ sparse matrix
$H^T_D H_D$: $N \times N$ sparse positive definite symmetric matrix A state of the art technique for solution of this normal system of equations is that of a sparse matrix method, : nested dissection 1, which has a numerical complexity on the order of $N\log_2 N$ floating point operations as opposed to $N^2$ such operations required of the brute force full-least-squares method.

In the case of a digital control loop for correction of atmospheric turbulence, the above system of equations must be solved at rate which is 10 times the temporal bandwidth of the atmosphere, approximately 500 Hz. For a large scale deformable mirror with 10,000 actuators, $N\log_2 N = 1.3 \times 10^5$, so the total computational burden is $0.65 \times 10^9$ floating point operations per second.

DISCLOSURE OF INVENTION

The invention relates to an optical processing system that accepts as input an optical beam containing distortions and controls a deformable mirror to correct for the distortions by generating a mirror surface profile that, point for point, is the additive inverse of the aberrated wavefront phase.

In a first step, the input beam is converted to a plane wave having an amplitude proportional to the phase of the input beam at a given point.

This intermediate beam undergoes iterative constrained deconvolution in which the intermediate beam is first interferometrically subtracted to produce a beam carrying an amplitude function that represents the residual wavefront error for the present deformable mirror actuator configuration. The error function beam is temporally integrated to assure convergence to zero of the steady-state loop error. The temporally integrated wavefront error is spatially integrated about each actuator position. The result of this operation is a set of spatial impulse functions having a magnitude representative of the setting of the corresponding mirror actuator in the current iteration of the convergence process. This set of impulse functions is then convolved with the actuator influence function.

The result of the convolution is a plane wave having an amplitude distribution that is proportional to the mirror displacement, which is added to or subtracted from the input beam and passed through the processing loop.

Other features and advantages will be apparent from the specification and claims and from the accompanying drawings which illustrate an embodiment of the invention.

BRIEF DESCRIPTION OF THE DRAWING

FIGS. 4a and 4b illustrate two approaches to a preliminary phase map extraction process incorporated in the invention.

FIG. 5 illustrates a block diagram to carry out the approach of FIG. 4a.

BEST MODE OF CARRYING OUT THE INVENTION

Figure 2A:
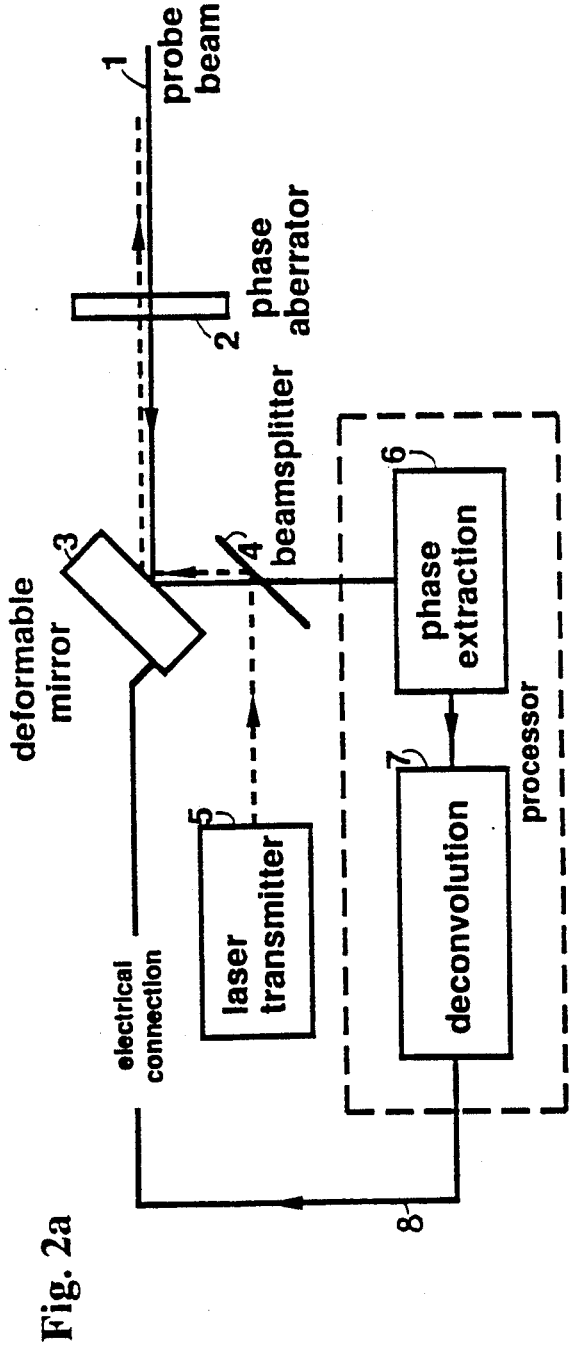
FIG. 2a illustrates in simplified form a block diagram of an optical system incorporating the invention.

FIG. 2a shows a schematic of the major components of an adaptive optics system employing the invention. An incoming probe beam 1 passes through a phase aberrator 2, such as the atmosphere. The probe beam is then reflected from deformable mirror 3, the purpose of which is to manipulate the phase of the beam so as to cancel the effects of the phase aberrator. In addition to correcting the phase of the incoming beam, such an arrangement works well as an adaptive laser transmitter system. An outgoing optical beam from the laser transmitter 5 is introduced into the system at the beamsplitter 4. The outgoing beam is then reflected from the deformable mirror 3 and is transmitted through the phase aberrator 2. The net effect of the deformable mirror and the phase aberrator is to create an outgoing beam which has no phase aberrations.

The invention described herein serves the purpose of calculating the displacements of each of the deformable mirror actuators in order to obtain the desired correction (i.e., a mirror surface profile which, point for point, is the additive inverse of the aberrated wavefront phase). With reference again to FIG. 2a, any nonzero phase present on the incoming beam after reflection from the deformable mirror represents an additional phase correction required of the deformable mirror. This incoming beam is then transmitted through the beamsplitter 4 to the optical processor 6 and 7. The beam first experiences the phase extraction process at 6. In this process, the incoming beam with arbitrary amplitude and aberrated phase is converted into a beam with amplitude proportional to the aberrated phase and with zero phase (i.e., a plane wave). This beam undergoes the iterative constrained deconvolution process 7. This process calculates the desired actuator displacements by operating on the beam exiting the phase extraction element 6. Therefore, the function of the processor (6 and 7) is to accept a phase aberrated beam and return the actuator displacements necessary to realize the desired phase correction (this is referred to as wavefront reconstruction/compensation). The beam control architecture shown in FIG. 2a is referred to as a "null-seeking" configuration because the closed loop, comprising elements 3, 6 and 7, endeavors to drive the phase aberrations at the input to the processor (at element 6) to zero.

Figure 2B:
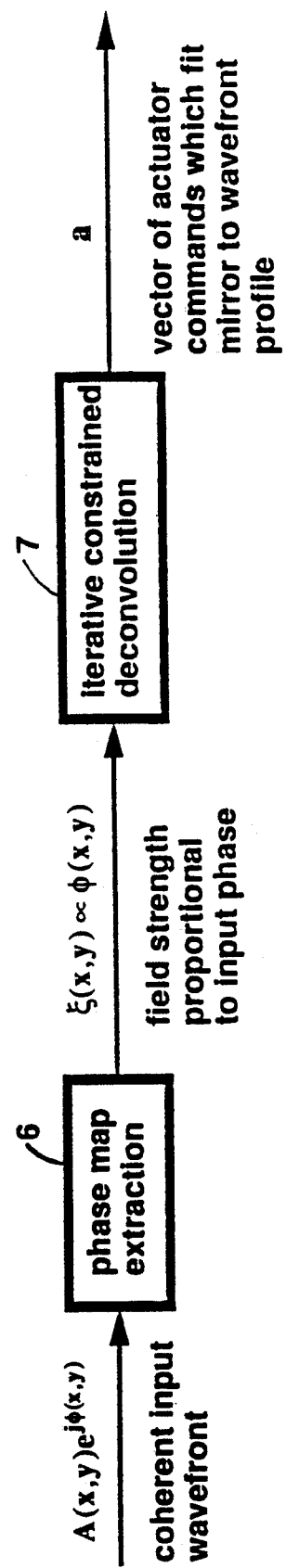
FIG. 2b illustrates in block diagram form the processes applied to an incoming beam to produce the electrical signals applied to deformable mirror actuators.

The optical processor is shown in functional form in FIG. 2b. The incoming beam is a field described mathematically in complex phasor from as $A(x,y)\exp(j\phi(x,y))$, where $A(x,y)$ is the amplitude of the beam, and $\phi(x,y)$ is the phase of the beam that is to be corrected. The incoming beam first experiences the phase map extraction process. The output of this process is a beam which has a field given by $\xi(x,y)\exp(j0)$, where the field amplitude is proportional to the input phase, that is $\xi(x,y) \propto \phi(x,y)$. This beam then experiences the iterative constrained deconvolution process. The output of this process is a set of amplitudes which correspond to the desired actuator displacements required of the deformable mirror in order to effect a phase change of $-\phi(x,y)$.

Figure 3A:
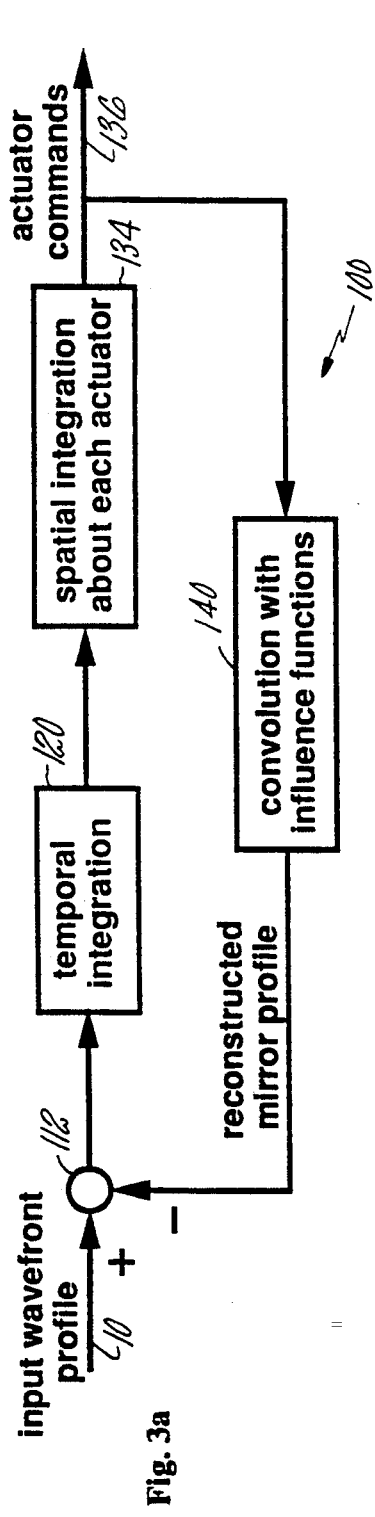
FIGS. 3a and 3b illustrate in mathematical and functional form the operation of the loop illustrated in FIG. 1.

The functional operations of the iterative constrained deconvolution process are shown in FIG. 3a. The corresponding mathematical operations are given in FIG. 3b. The computational quantity is the amplitude profile of the coherent optical wavefront which is caused to propagate iteratively through the loop. In one embodiment, a purely optical implementation, the light propagates uninterrupted. In an alternative hybrid scheme, the light is detected and used to remodulate the intensity of the light source. The input wavefront profile 100 and the reconstructed mirror profile are subtracted interferometrically at beamsplitter 112. Both optical fields are plane waves; one wavefront is delayed by $\pi$ radians of phase shift relative to the other (by adjustment of optical path lengths) in order to achieve interferometric subtraction. The resulting difference beam represents the residual wavefront error that would remain after correcting the input wavefront with the mirror profile resulting from the set of actuator commands at the present iteration. The error is temporally integrated at 120 with the error from the previous iteration resulting in the total wavefront error. The temporal integration is required from a control loop standpoint in order to assure that steady state loop error converges to zero.

The wavefront error is spatially integrated about each actuator position at 134 to determine the average wavefront error in a region centered about each actuator. Since individual actuators have influence only in a local region about their respective locations, these local average temporally integrated errors are the estimates of actuator commands 136 at the current iteration.

Impulse functions having magnitudes equal to the current iteration actuator command estimates are convolved with the actuator influence function at 140. The result of this operation is the creation of a plane wave with an amplitude profile representing the two-dimensional mirror surface profile. This closed loop processor operates iteratively on the two dimensional amplitude profile of the circulating light (in the purely optical implementation) until the residual error at 120 is minimized (approximately 7 to 10 iterations). At the time of such convergence the actuator command values are sampled and fed to the deformable mirror to implement the physical correction of the aberrated beam.

Figure 3B:
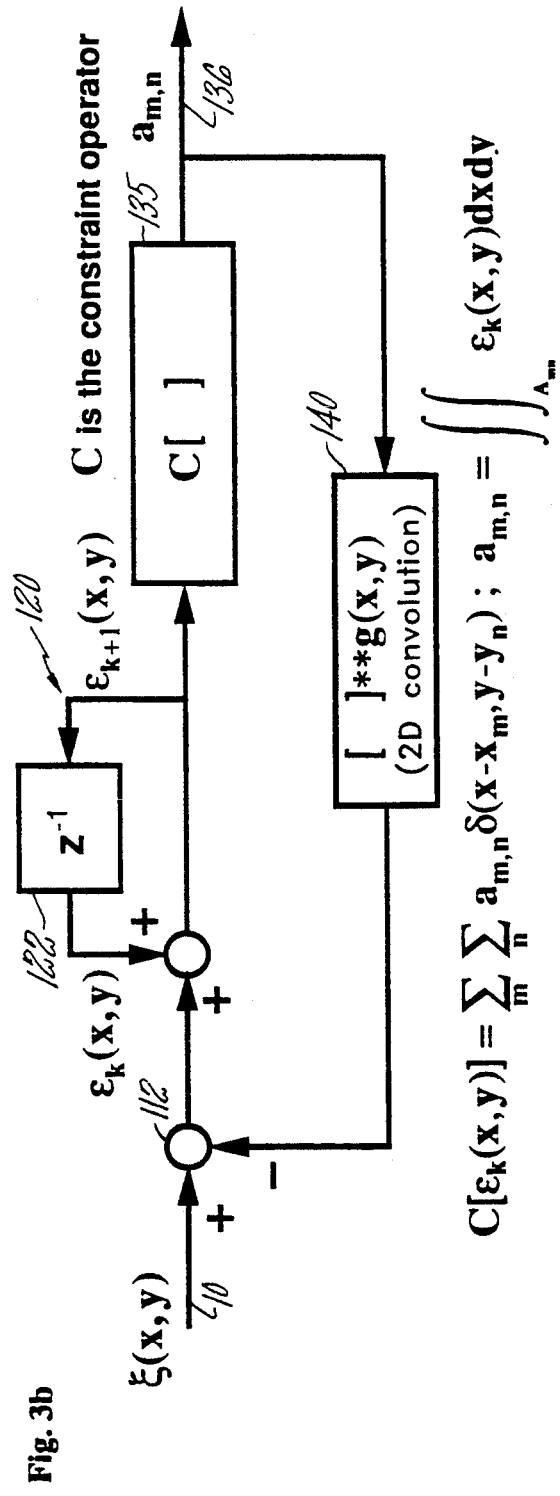

FIG. 3b describes the corresponding mathematical formalism of iterative constrained deconvolution which is explained in D. Dudgeon and R. Mersereau, "Multidimensional Digital Signal Processing", Prentice-Hall, 1984. The temporal integration is depicted as a sampled data delay (in unit 122) and sum function at 120, where subscript k denotes iteration number. The constraint operator 135 partitions the error wavefront, $E_{k+1}(x,y)$, into subapertures about each corresponding mirror actuator location, spatially integrates the amplitude of the error wavefront (obtains the average error) within each subaperture and creates an output array of spatial impulses 136 located at corresponding actuator (x,y) positions having amplitudes equal to the average wavefront error in each corresponding subaperture. Convolution of this array of impulses with the actuator influence function at 140 provides a plane wave having an amplitude profile which is an estimate of the original aberrated wavefront phase. Over a number of iterations, this loop configuration tends to drive to zero the error in this estimate created by an influence function model of mirror behavior The extraction of the actuator commands which achieve this fit is seen to be an implicit deconvolution of the influence function from the aberrated wavefront phase.

Figure 1A:
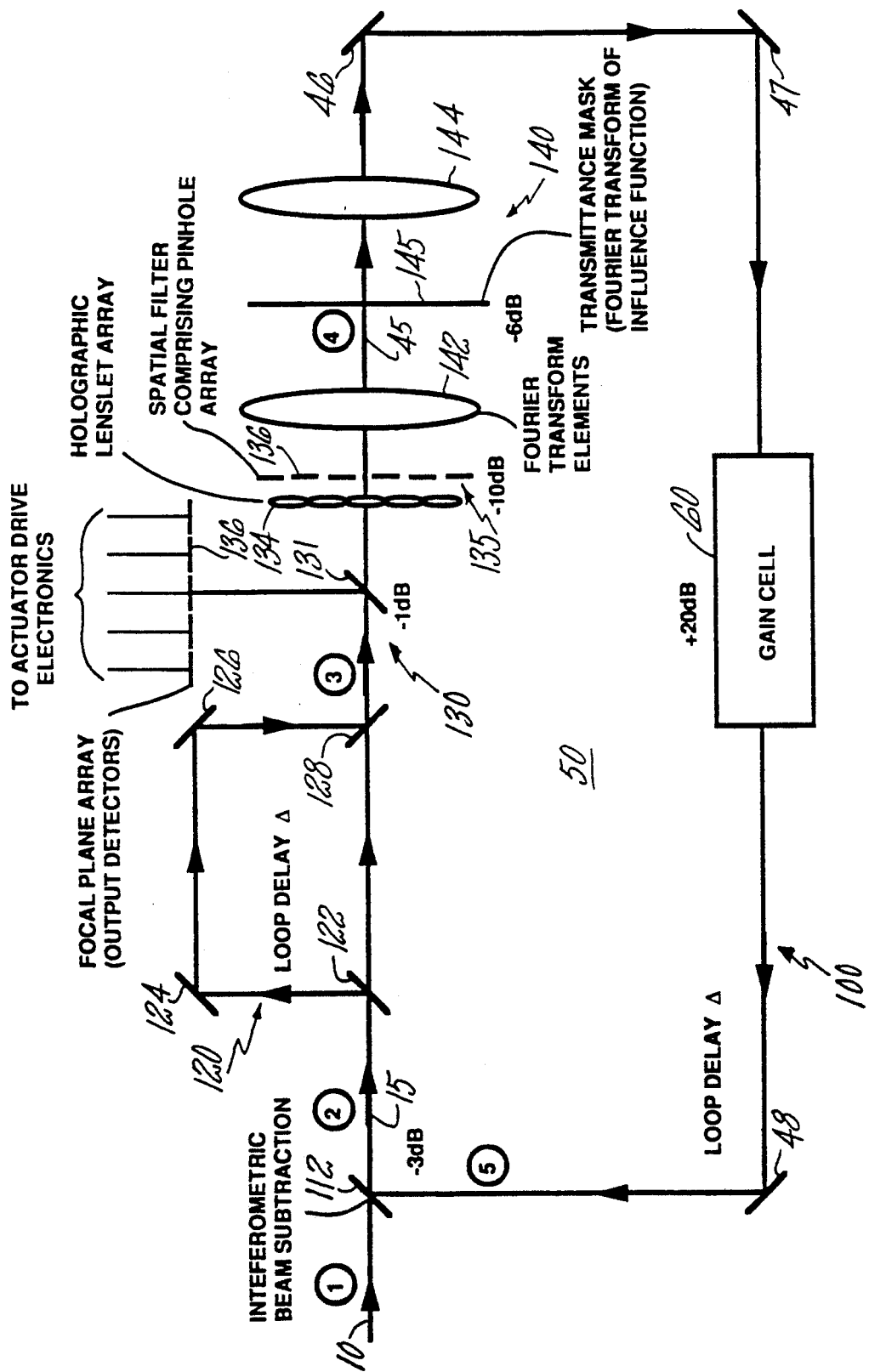
FIGS. 1a and 1b illustrate in partially schematic, partially pictorial form an optical computing loop constructed according to the invention.

A physical embodiment of the system of FIGS. 3a and 3b is illustrated in FIG. 1a showing the incoming plane wave beam 10 at the upper left of the drawing. This beam has an amplitude profile equal to the phase aberration profile of the original wavefront. The amplitude profile of the initial reconstructed estimate is subtracted from the incoming beam, interferometrically, as the beams are combined in transmitting beamsplitter 112. This error beam then passes through integration module 120 which is simply a loop delay that diverts half the beam, delays it by the time taken to transmit the main loop and then folds it back in at the beamsplitter 128. The next section, denoted by the numeral 130, is the output section of the process in which a portion of radiation is tapped off by beamsplitter 131 and brought to a focal plane array of detectors. Each subaperture region of this output beam wavefront directed to each effective detector (each effective detector can comprise a number of focal plane pixels, (the outputs of which are summed) is sized and scaled with respect to the optical beam and the whole system such that the radiation of each effective detector is proportional to the area influenced by each actuator in the deformable mirror. The number and relative location of these subaperture regions will be scaled to correspond to the actual number and location the actuators on the mirror.

To the right of beamsplitter 130, there is a lenslet array 134 such as that available from Adaptive Optics Associates of Cambridge, Mass., or a holographic lenslet array that focuses each subaperture of the collimated beam traveling around the loop to a corresponding pinhole in a spatial filter 136. The output of each pinhole will be a spatial impulse of light having a field strength that is proportional to the average value of the respective input subaperture field strength. The lenslet array and pinhole array spatial filter together denoted by the numeral 139 perform the constraint operation of box 135 in FIG. 3a. Each lenslet and pinhole pair provide as an output, the average value of the electric field in a subaperture region that is a physical space corresponding to the influence area exerted by that actuator on the deformable mirror surface.

The Fourier transform of the subaperture beam amplitude profile is provided at the plane of the corresponding pinhole, which acts as a spatial low-pass filter allowing only dc, or average value, of the input amplitude profile to be transmitted. Next, unit 140 performs an optical convolution of the amplitude impulses exiting the pinholes with the influence function of a single actuator. This convolution is performed by the following means well known in the prior art. A Fourier transform of the input field is created by a lens or mirror element 142 at its focal plane. A mask 145 is placed in this plane which has a transmittance profile which is the Fourier transform of the actuator influence function. The product of the Fourier transforms of the input field and the influence function is thereby achieved as light transits this mask. The inverse Fourier transform of this product provided by transform element 144 is then a beam having an amplitude estimate of the desired mirror surface. This beam is then propagated around the loop back to the input beamsplitter 112 via folding mirrors 46, 47 and 48. Element 60 is a coherent image amplification cell, such as that shown in R. Akins and S. Lee, "Coherent Optical Image Amplification by an Injection-locked Dye Amplifier at 632.8 nm", Applied Physics Letters, Vol. 35, No. 9, Nov. 1, 1979, or in H. Rajbenbach, A. Delboulbe and J. Huignard, "Noise Suppression in Photorefractive Image Amplifiers", Optics Letters, Vol. 14, No. 22, Nov. 15, 1989, pg. 1275-1277, with gain sufficient to compensate for optical losses to the light traversing the loop.

FIG. 1a depicts an alternate embodiment of the deconvolution process which is a hybrid of electronics and optics. As in the approach of FIG. 1a, the reconstructed beam is subtracted from the incoming beam 198 at beamsplitter 200. The error wavefront 215 is sampled as before at beamsplitter 222 to provide actuator amplitudes at detector array 236 (unless heterodyne detection is employed, the actuator commands are proportional to the square root of the detected intensities). Determination of the average field amplitude for each subaperture is accomplished as before with lenslet array 234 and pinhole array 235. Subsequently, two functions are achieved by performing detection of these amplitudes at the pinholes; first, the individual detectors convert the amplitudes to voltage levels and second, the temporal response of the detectors and their amplifiers allows the temporal integration of the field, previously performed by a recirculating optical delay line, to be performed electronically. These voltages will be used to modulate a laser source 238 which is coherent with the input beam 198 inasmuch as both sources of light are originally derived from a common laser. All coherent light used by the optical processor is derived from a common laser source (a small portion of a high energy laser beam can be extracted and spatially filtered to serve as such a processor light source.

The collimated laser beam 240 emanated by source 238 illuminates a multiple quantum well spatial light modulator 10 here depicted as a two dimensional array of transmissive pixel modulators 250, one corresponding to each subaperture detector in detector array 237. The transmissivity of each pixel and hence the amplitude of the output light is controlled by the voltage of the corresponding detector amplifier. The divergence of the spatially uniform light beamlet exiting each pixel can be well controlled with micro-optics as is taught in J. Finlan and K. Flood, "Collimation of Diode Laser Arrays Using Etched Cylindrical Computer-Generated Holographic Lenses", SPIE Vol. 1052, 1989, pg. 186-190; S. Ogata, M. Tanigami, H. Sekii, T. Maeda, H. Goto and K. Imanaka, "Low Wavefront Aberration Micro Collimated Laser Diode", SPIE Vol. 1219, 1990, pg. 385-393; and J. Jahns, N. Streibl and S. Walker, "Multilevel Phase Structures for Array Generation", SPIE Vol. 1052, pg. 198-203. Here again, spatial convolution is performed by Fourier transform elements 260 and 270 in concert with influence function transmittance mask 265. The output reconstructed field is directed around the loop by folding mirrors 275, 280 and 285.

A further variation on this approach is to implement the functions of elements 200, 222, 234 and 235 electronically, as well. Separate detector arrays would detect the incoming beam 198 and reconstructed beam 290 and either feed the detected signals to analog difference amplifiers or perform analog to digital conversion, digital subtraction and digital to analog conversion. Upon inclusion of temporal integration of these error signals in the aforementioned process, the square root of these outputs would directly drive the spatial light modulator array 250. Among the various implementation alternatives, speed and accuracy trades are to be considered For example, the approach of FIG. 1a sustains a solution convergence time dictated only by the delay of light propagating around the loop the requisite number of iterations. The speed of approach 1b is limited by the bandwidth of the spatial light modulator which is of the order of megahertz This latter approach also does not require a separate source of loop gain by virtue of laser source 238.

Figure 7A:
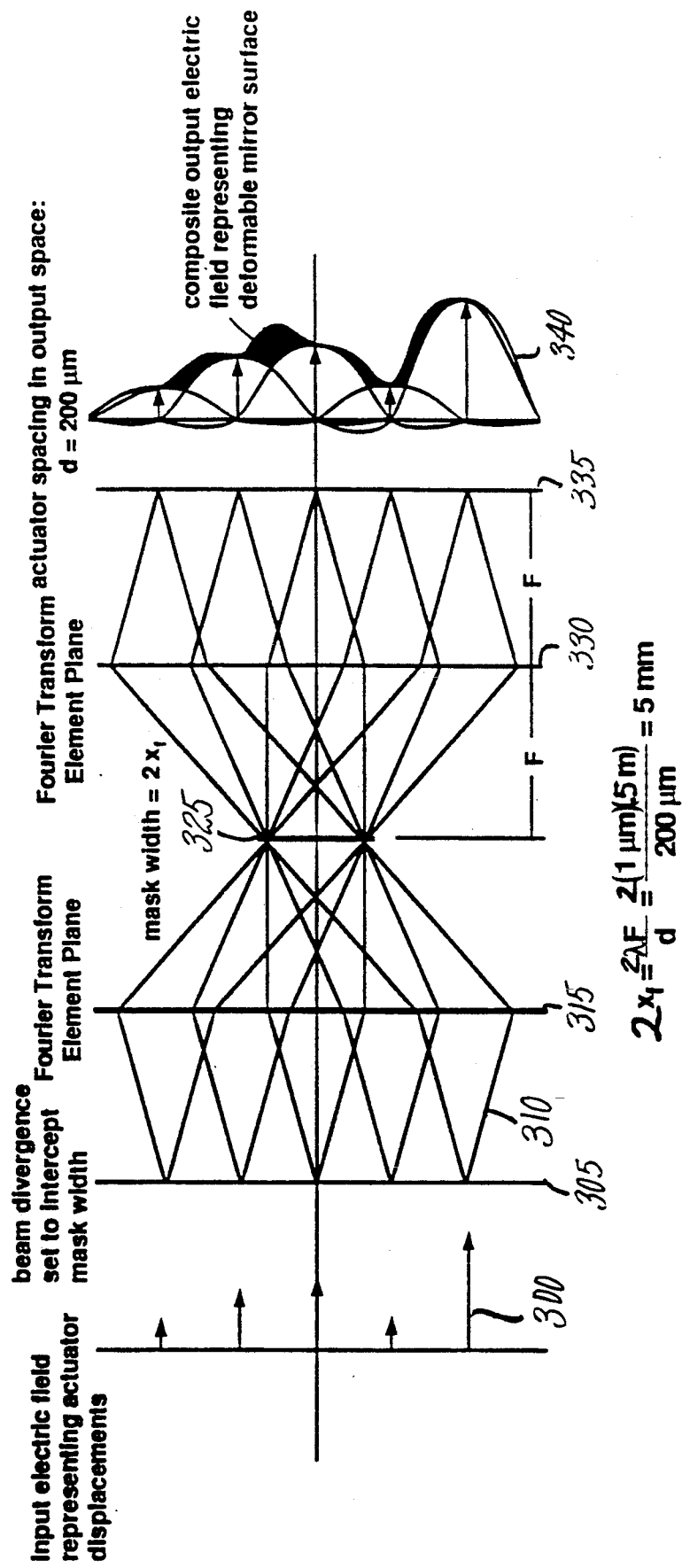
FIG. 7a illustrates the convolution geometry by means of a ray trace diagram.
Figure 7B:
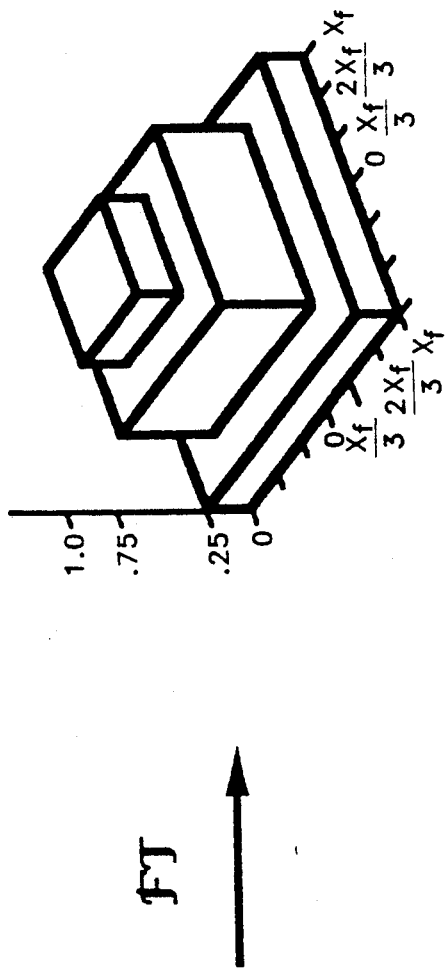
FIG. 7b depicts the spatial distribution of an actuator influence function and its Fourier transform.

FIG. 7a depicts a realizable geometry for the convolution process involving the pinhole array and the transmittance mask. The field amplitude at the exit plane of the pinhole array 135, in the case of FIG. 1a, are represented by spatial impulses 300. The divergence of exit beams 310 at plane 305 (135) is controlled by pinhole diameter. A Fourier transforming element at plane 315 will cause these beams to illuminate a mask 325 of width $$2x_f = \frac{2\lambda F}{d}$$

given pinhole diameter d, Fourier lens focal length F and wavelength $\lambda$. The inverse Fourier transform element at plane 330 provides the convolution output at plane 335, pictorialized as a superposition 340 of the individual actuator influences. Given a mirror having an array of 100×100 actuators, a mapping of this geometry onto 200 micron centers results in a representative wavefront at plane 335 of 2 centimeter width. With a 0.5 meter Fourier transform element focal length, an optical wavelength of 1 micron the transmittance mask width is 5 millimeters. FIG. 7b shows the profile of a typical actuator influence function for a cooled deformable mirror used in high-energy laser applications and the corresponding Fourier transform transmittance mask. For this particular influence function, which is common, the Fourier transform is conveniently a well behaved, pure real function which is implemented as a spatial variation in the absorption of photographic film. In general, the Fourier transform of influence functions for different mirrors will be complex (comprise amplitude and phase variation) and the corresponding mask in order to incorporate phase behavior will be holographic. Additionally, the given actuator geometry will require a corresponding lenslet—pinhole configuration. For example, a hexagonally symmetric actuator placement will require a hexagonally symmetric lenslet-pinhole geometry.

A simulation of the operation of the constrained deconvolution loop has been performed with the result that the wavefront converges after only 6 iterations to an error less than the error of a numerical least-squares fitting on the same input data.

Referring now to FIG. 4, there is shown in FIGS. 4a and 4b two alternative approaches to the phase map extraction process in FIG. 2. Approach 1 on the left accepts as input the return beam from the atmosphere; applies the process of degenerate four-wave-mixing (DFWM) in saturation mode such that the amplitude of the beam is rendered uniform while the phase profile is preserved.

Figure 8:
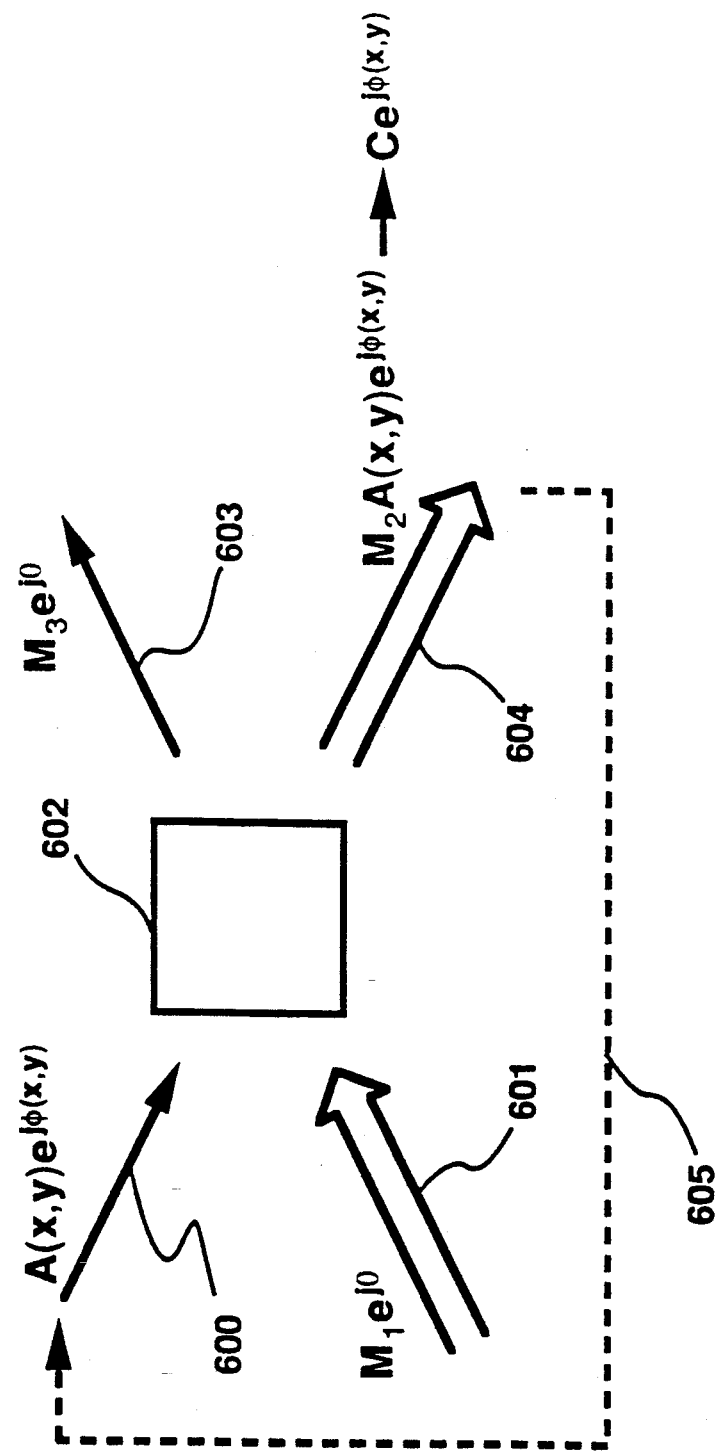
FIG. 8 illustrate a nonlinear optical technique for phase map extraction.

Another approach to rendering the wavefront uniform intensity while retaining the phase involves the use of two-wave mixing 13, 14 in an iterative fashion as shown in FIG. 8. In FIG. 8 there is depicted the conventional two-wave interaction between a probe beam 600 and a pump beam 601. Within the two-wave mixing medium 602 energy is transferred from the high power uniform intensity pump beam 601 to the low power signal probe 600 without phase cross-talk. Amplified output beam 604 is then iteratively fed back (along path 605) as a probe input so that its amplitude will eventually saturate and the amplitude profile will become uniform. The depleted pump beam 603 is unused.

Next, the wavefront is spatially differentiated by a high-pass filter operation in the Fourier transform domain. The resulting wavefront now has an amplitude variation proportional to the sum of the x and y spatial derivatives of the phase profile of the input beam and with a phase variation which remains the phase profile of the input beam. Subsequently, this wavefront is input to another DFWM cell which is configured to create a wave which retains only amplitude variation. The result is a plane wave with an amplitude profile proportional to the sum of the spatial derivatives of the aberrated beam phase profile, but which now has zero phase variation. Spatial integration of this field distribution then provides an output beam having no phase variation and an amplitude profile proportional to the phase profile of the original aberrated input beam. This beam is input to the loop of FIG. 1.

The second approach employs a hybrid scheme in which a Hartmann wavefront sensor generates electrical measurements for each subaperture of the beam representing the tilt of the phase front over that subaperture area. The set of signals is then processed electronically, as in a digital computer. Numerical integration of these measurements then produces a set of numbers that represent the wavefront phase. This numerical set of wavefront phases is then applied to an electronically addressed spatial light modulator such that the transmittance of each subaperture in the modulator is proportional to the signal representing wavefront phase. Thus, a uniform intensity plane wave beam passing through this spatial light modulator will then have its phase unaffected to the degree that is relevant here and an amplitude that is proportional to the phase of the original wavefront.

Figure 5:
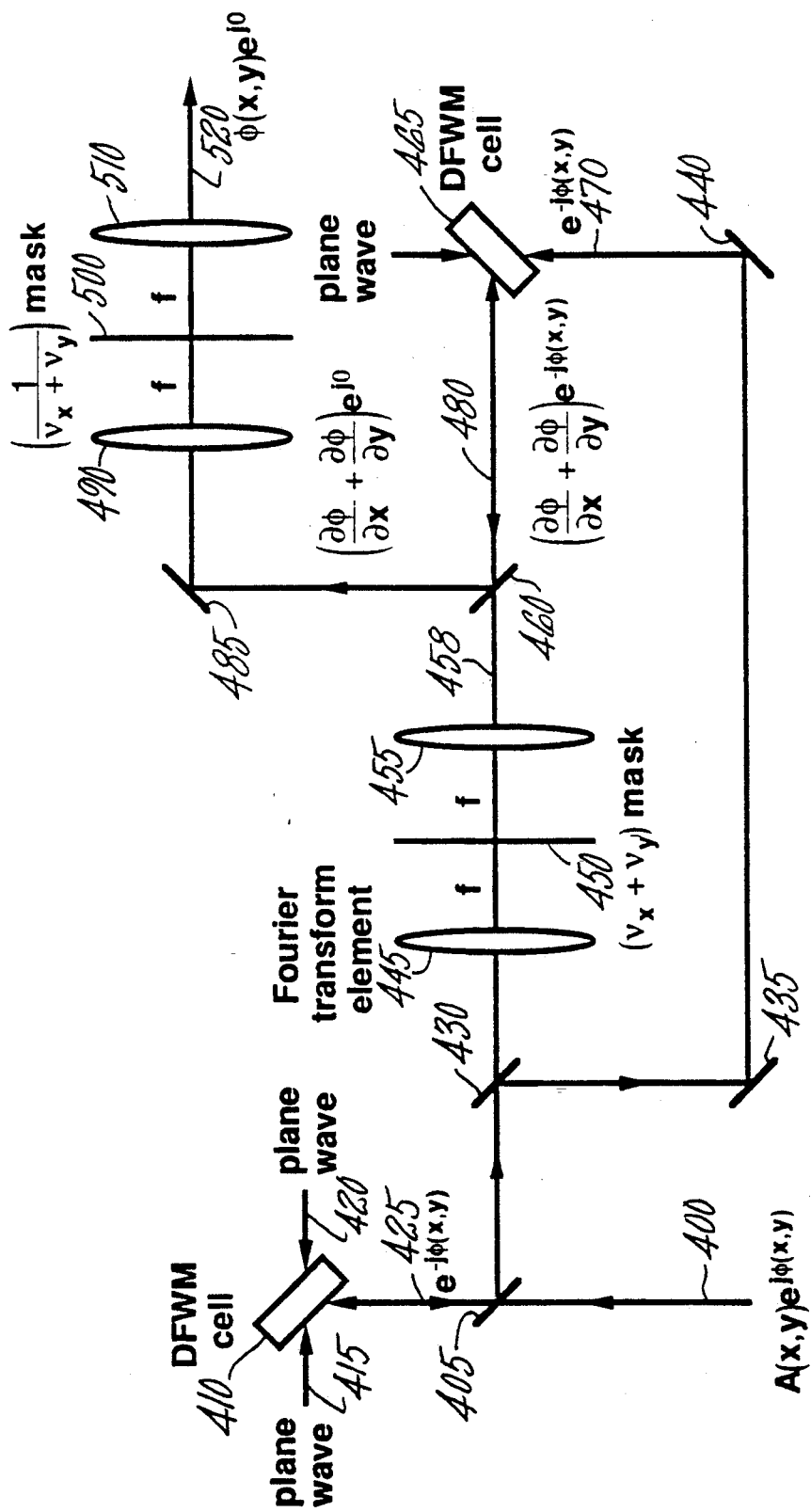

Referring now to FIG. 5, there is shown a block diagram of an apparatus to carry out the approach of FIG. 4a. The input beam 400 has an arbitrary amplitude and phase profile. First, the input beam undergoes a process whereby the wavefront amplitude can be made uniform while retaining the wavefront phase profile. The beam 400 traverses beamsplitter 405 and is presented as a probe wave to degenerate four-wave-mixing cell 410. The mean intensity of this beam is adjusted so as to be significant relative to the intensities of plane waves 415 and 420 which serve as pump beams in DFWM process. The intensity of the conjugate wavefront 425 is saturated by pump depletion so that it is devoid of spatial intensity variation. A portion of the conjugate beam 425 is reflected from beamsplitter 405 and directed through beamsplitter 430 to the front focal plane of a Fourier transform lens 445. The combination of Fourier transform lenses 445, 455 and transmittance mask 450 placed at the intervening transform plane spatially differentiate the field of beam 425 to provide a beam 458 with an amplitude proportional to the spatial derivative of the phase. Mask 450 is patterned in standard fashion as taught in the textbook J. W. Goodman, "Introduction to Fourier Optics", McGraw-Hill, 1968. Beam 458 then traverses beamsplitter 460 and is input as a probe wave to a second DFWM cell 465. In this instance, a portion of beam 425 enters as beam 470 and a plane wave from the third beam. The complex field strength of the conjugate wave 480 can be shown to be proportional to the triple product of factors comprising the pump wave complex fields and the complex conjugate of the probe wave. Consequently, the conjugate wave will be a plane wave retaining only the amplitude variation of the probe beam. Beam 480, propagating to the left, is reflected from beamsplitter 460 and mirror 485 through elements 490, 500 and 510 that in this case perform the spatial integration of the input wave 480 so that the final output beam 520 is a plane wave with amplitude variation proportional to the phase of the original input beam. Mask 500 is also constructed according to the teaching the Goodman textbook.

Figure 1B:
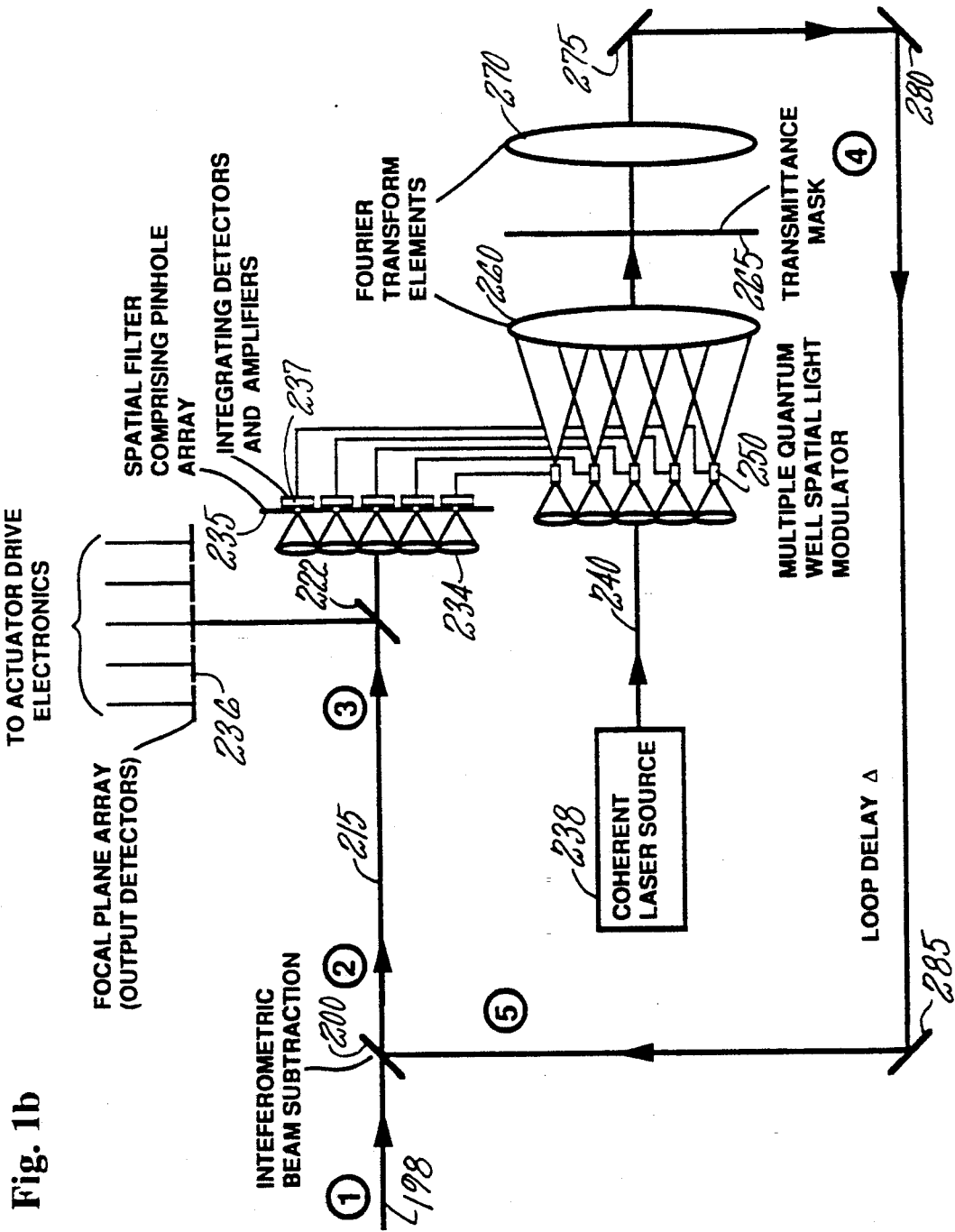
Figure 6:
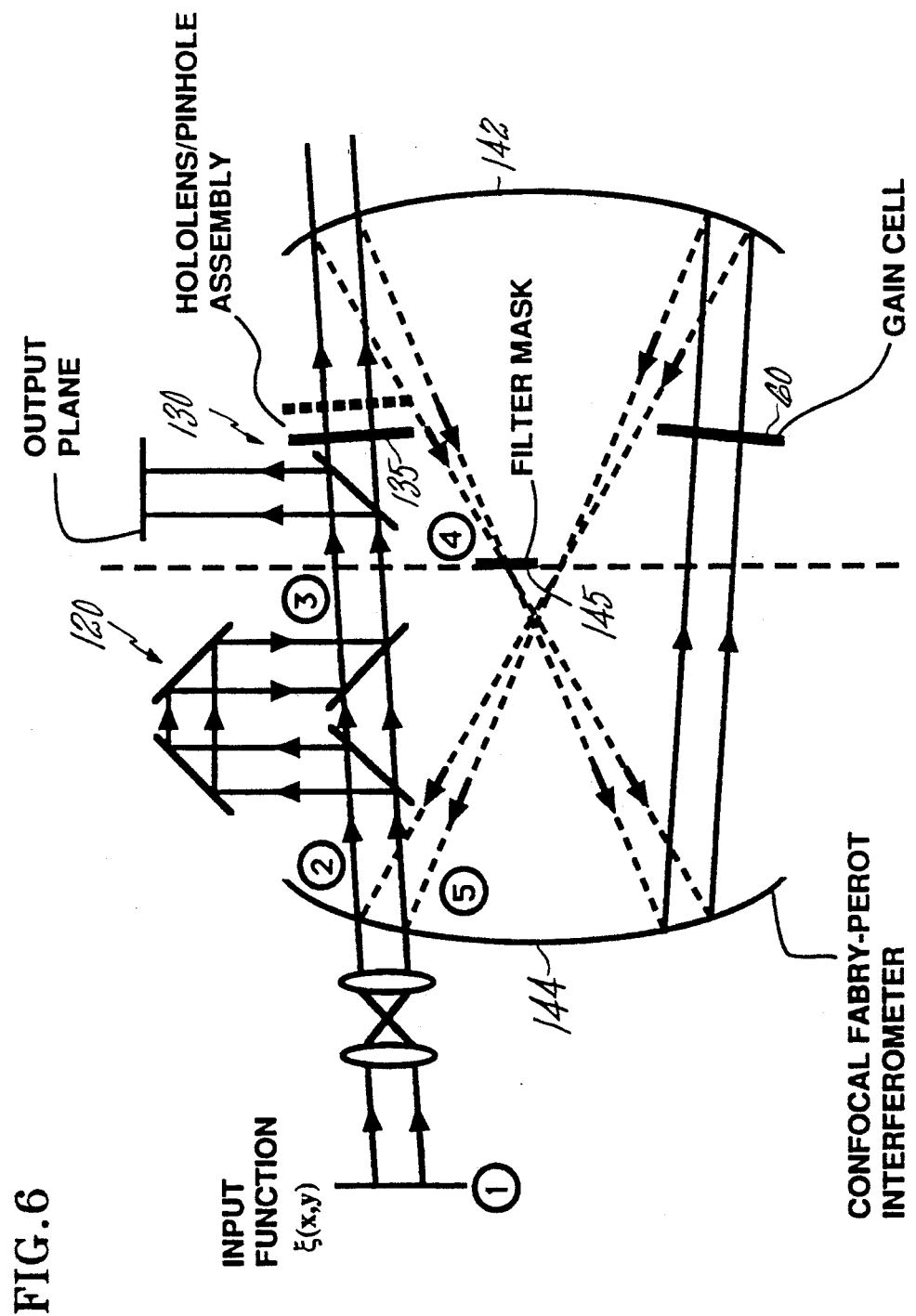
FIG. 6 illustrates in partially pictorial, partially schematic form an alternative embodiment of FIG. 1.

Referring now to FIG. 6, there is shown a convenient alternative implementation of the processing loop of FIG. 1. The same phase map beam enters from the left through the partially transmitting portion in one of a pair of confocal mirrors 144 and 142. It passes through the same integration loop 120, same output unit 130 and through the same constraint unit 135. The mirrors 142 and 144, respectively correspond to the Fourier transform elements 142 and 144 in the embodiment of Figure.

It should be understood that the invention is not limited to the particular embodiments shown and described herein, but that various changes and modifications may be made without departing from the spirit and scope of this novel concept as defined by the following claims.

What is claimed is:

1. A processing system, responsive to an input probe beam, having an input probe beam phase distribution for controlling a deformable mirror having a deformable surface that may be displaced by a set of actuators to assume a displacement distribution that reflects said input probe beam emerging from an aberrator and manipulates an output optical beam from a laser to compensate for said aberrator, comprising:

a phase extraction unit disposed to receive said input probe beam after reflection from said deformable mirror, for generating therefrom an intermediate optical beam having an intermediate amplitude distribution related to said input probe beam phase distribution;

a deconvolution unit for operating on said intermediate optical beam by an iterative process to generate therefrom an actuator control beam having an amplitude distribution that has a set of values at predetermined positions on an actuator control beam wavefront that are related to corresponding displacements of said deformable mirror surface at positions corresponding to said predetermined positions on said actuator control beam wavefront; and detector means for detecting said set of valves, generating therefrom actuator control signals and applying said actuator control signals to said set of actuators.

2. A system according to claim 1, in which said phase extraction unit comprises DFWM means for converting said input probe beam to a first intermediate beam having substantially uniform amplitude and said input probe beam phase distribution, optical means for taking the derivative of said first intermediate beam to generate a first derivative beam having an amplitude distribution that is related to the first spatial derivative of the phase front of said input beam, DFWM means for combining said first derivative beam and said first intermediate beam to generate therefrom a second derivative beam having a substantially uniform phasefront; and optical integration means for integrating said second derivative beam to generate therefrom said intermediate beam having a substantially uniform phasefront and an amplitude distribution related to said input probe beam phase distribution.

3. A system according to claim 1, in which said phase extraction unit comprises wavefront sensor means for measuring subaperture tilts of said input probe beam, electronic computing means for computing subaperture phase values from said measured subaperture tilts, and spatial light modulation means for imparting to a uniform optical plane wave intensity variation corresponding to said computed phase values.

* * * * *